United States Patent [19]

Yamato

[11] Patent Number: 4,903,427
[45] Date of Patent: Feb. 27, 1990

[54] FISHING ROD
[75] Inventor: Yoshiro Yamato, Sakai, Japan
[73] Assignee: Shimano Industrial Company Limited, Osaka, Japan
[21] Appl. No.: 307,338
[22] Filed: Feb. 7, 1989
[30] Foreign Application Priority Data Feb. 10, 1988 [JP] Japan .................. 63-16852[U]

[51] Int. Cl.⁴ .................................. A01K 87/06
[52] U.S. Cl. .................................. 43/22; 43/23
[58] Field of Search .............. 43/22, 23; 16/115; 81/177.7

[56] References Cited

U.S. PATENT DOCUMENTS

| | | | |
|---|---|---|---|
| 2,808,676 | 10/1957 | Major | 43/23 |
| 3,468,052 | 9/1969 | Hardesty et al. | 43/23 |
| 3,827,173 | 8/1974 | Barnes | 43/23 |
| 4,419,025 | 12/1983 | Takahashi | 16/115 |
| 4,637,157 | 1/1987 | Collins | 43/23 |
| 4,738,046 | 4/1988 | Fraylick et al. | 43/23 |

Primary Examiner—Nicholas P. Godici
Assistant Examiner—Michael William Starkweather
Attorney, Agent, or Firm—Stevens, Davis, Miller & Mosher

[57] ABSTRACT

A fishing rod comprising a hollow rod body and a grip coupling with the bottom rod at the rod body, the grip being provided with a short first grip portion and a long second grip portion, and with an insertion control positioned between the first and second grip portions and setting the insertion position into the rod body, so that the grip is turned over to be inserted into the rod body to be changed in length, thereby making the fishing rod adjustable of its entire length.

10 Claims, 2 Drawing Sheets

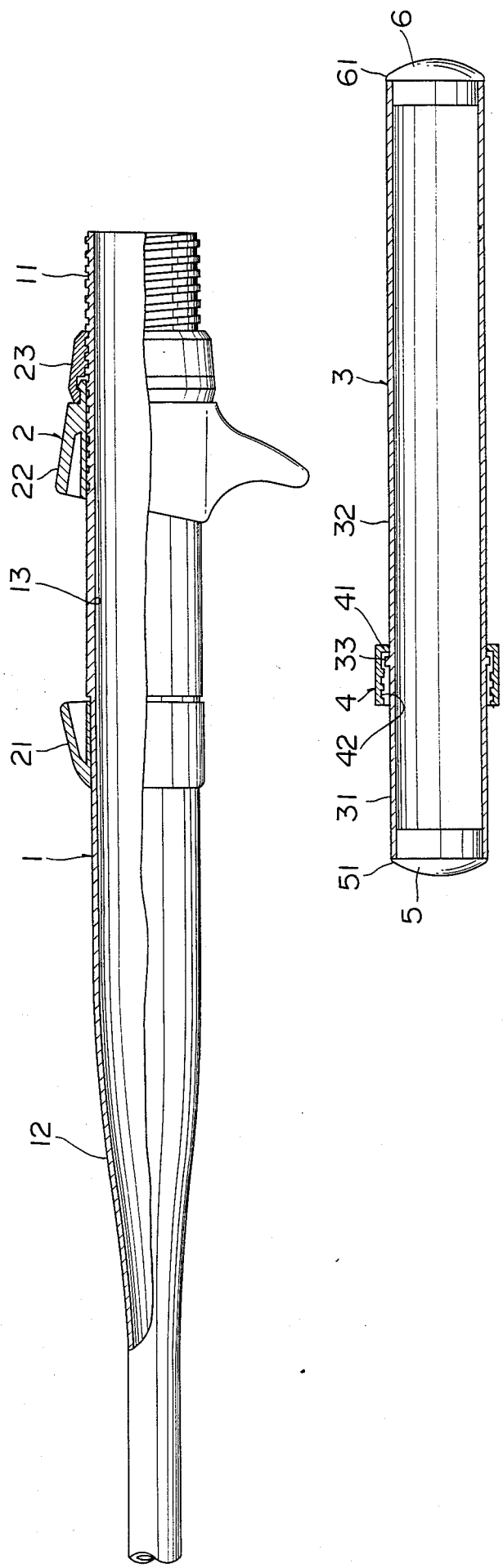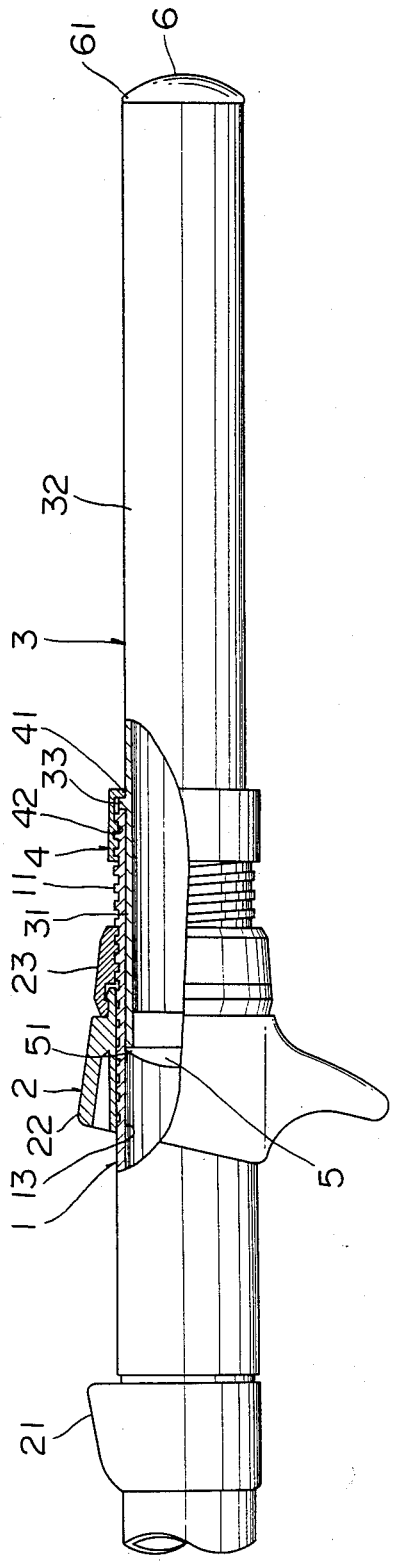

FISHING ROD

FIELD OF THE INVENTION

The present invention relates to a fishing rod, and more particularly, to a fishing rod adapted to enable changing of the effective length of its grip and in turn the entire length of the fishing rod.

BACKGROUND OF THE INVENTION

Generally, different length fishing rods are used corresponding to a fishing site, such as a mountain stream, a lake or the sea. Accordingly, an angler usually separately carries both a short fishing rod and a long rod.

A fishing rod capable of having its entire length adjusted by changing the grip length has hitherto been proposed. For example, as disclosed in Japanese Utility Model Laid-Open Gazette No. Sho 60-89,869, a fishing rod has been proposed which is provided at the bottom portion of a hollow rod body with a short grip having a fitting bore and separately uses a long grip and a tail plug so as to change the length of the grip portion and adjust the entire length of the fishing rod. The long grip is fitted at its utmost end into the fitting borer at the grip portion to increase its length and the tail plug, instead of the long grip, is fitted into the bore to reduce the length in comparison with the use of the long grip portion.

In this type of conventional fishing rod, when the grip portion is reduced in length, the long grip is removed from the rod body and the tail plug also is removed, thereby creating a problem in that the long grip or the tail plug, when removed from the rod body, is subject to being lost or forgotten when the angler moves his equipment.

SUMMARY OF THE INVENTION

An object of the invention is to provide a fishing rod having a gripping portion which facilitates changing of the effective rod length and wherein the grip is kept always in the state of being set to a rod body without being removed therefrom, so that there is no risk that the grip may be lost or forgotten when the equipment is moved.

The present invention is characterized in that the fishing rod comprises (1) a hollow rod body which is gently tapered and is larger in diameter at its bottom portion, and (2) a grip to be fitted into the bottom portion, the grip having a predetermined length and being provided at one lengthwise side with a short first grip portion and at its other lengthwise side with a long second grip portion. Between the first grip portion and the second grip portion is provided an insertion control for setting the insertion position of the grip fitted into the rod body. A fixing means is provided which detachably fixes the grip to the rod body.

In the fishing rod of the invention, the first grip portion is fitted into the rod body and is fixed thereto by the fixing means, thereby providing an elongated grip portion and in turn increasing the entire effective length of the fishing rod. The grip is reversible so that the second grip portion located on the other end can be fitted into the rod body and fixed thereto by the fixing means, thereby reducing the length of the gripping portion and in turn the entire effective length of the fishing rod.

In either case, the grip is fitted into the rod body, thereby being not lost or forgotten when the angler moves to a new position.

In addition, the bottom portion is provided with a grip insertion portion larger in axial length that the second grip portion, the grip insertion portion being cylindrical and substantially uniform in diameter. Also, the grip to be fitted inside or outside the grip insertion portion is cylindrical and substantially uniform in diameter.

The grip is provided at both lengthwise ends thereof with tail plugs of elastic material, the tail plugs each having a flange of a slightly larger outer diameter than an inner diameter of the grip insertion portion, whereby the grip, when fitted therein, can eliminate a backlash with respect to the rod body.

The fixing means preferably employs a threaded cylinder having an engaging portion engageable with the grip insertion control. Also, the rod body may be provided with an annular retaining groove and an engaging cylinder engageable therewith may be used as the fixing means, or the grip itself may be provided with a screw thread so as to be coupled with the rod body.

The above and further objects and novel features of the invention will be more fully apparent from the following detailed description when read in connection with the accompanying drawings.

BRIEF DESCRIPTION OF THE DRAWINGS

FIG. 1 is a partially cutaway exploded view of an embodiment of a fishing rod of the invention.

FIG. 2 is a partially cutaway side view of the FIG. 1 embodiment, in which a grip portion is elongated.

DETAILED DESCRIPTION OF THE INVENTION

Figure 3:
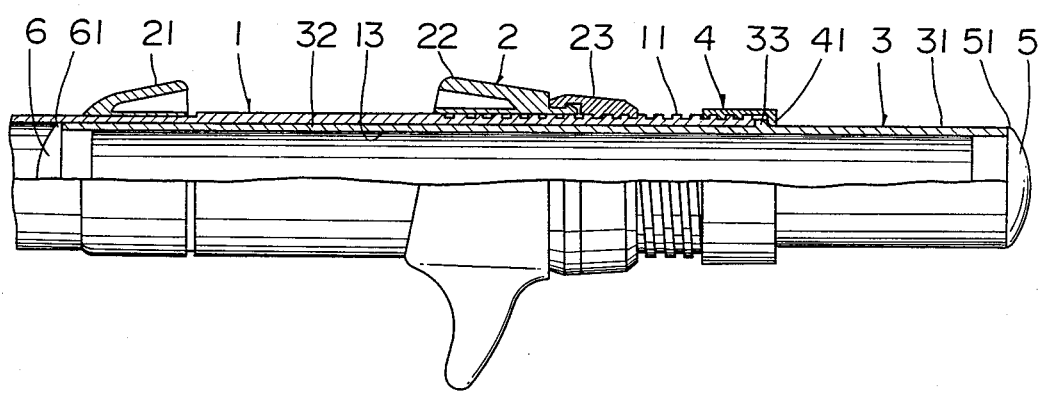
FIG. 3 is a partially cutaway side view of the FIG. 1 embodiment in which the grip portion has a reduced length.

Referring to FIGS. 1 through 3, an embodiment of the fishing rod of the invention is constructed such that prepreg of high strength fiber impregnated with synthetic resin is wound onto a core bar and burned under pressure so as to form a hollow rod body. A screw thread 11 is provided at the outer periphery of the bottom portion of the rod body. A reel mounting portion 2 having a fixed holder 21, a movable pusher 22, and a threaded cone 23 screwable with screw thread 11 to movably operate movable pusher 22, is provided on the bottom rod at the rod body. A grip 3 having a predetermined length is coupled with the bottom portion behind the reel mounting portion 2. The grip 3 is provided at one lengthwise side thereof with a first shorter grip portion 31 and insertable into the rod body 1, at the other lengthwise side with a second longer grip portion 32 and also insertable into rod body 1. An annular insertion control 33 is provided between the first and second grip portions 31 and 32. Annular insertion control 33 abuts against the end face of the bottom portion to set the insertion position of the grip 3 into the rod body 1. A threaded cone 4 having an engaging portion 41 engageable with the insertion control 33 and an internal screw threaded 42 screwable with the screw thread 11 is held to the grip 3 so as to be axially movable and reversibly insertable, with the internal screw thread 42 screwing with the screw thread 11 at the rod body 1 to thereby detachably fix the grip 3 thereto.

In the above-described construction, the rod body 1 is gently tapered. A larger diameter bottom rod as shown in FIG. 1 is made substantially uniform in diameter through a tapered portion 12 tapered toward the tip at a larger rate of change than that at the tip side, and forms a grip insertion portion 13 into whch the grip 3 is inserted. Grip insertion portion 13 is longer than a second grip portion 32 at the grip 3. In the first embodiment, the grip 3 to be fitted into the grip insertion portion 13 is formed to have a cylindrical shape substantially uniform in diameter and has an outer diameter slightly smaller than an inner diameter of the grip insertion portion 13.

Since the grip insertion portion 13 is made larger in diameter through the tapered portion 12, the grip 3 is enabled to have a larger diameter so as to be easy to grip.

The grip 3, the same as the rod body 1, is formed of prepreg of high strength fiber which is impregnated with synthetic resin and burned under pressure to be made hollow. The insertion control 33 is molded to be partially larger in thickness, and after being molded, is cut at both axial ends. In the first embodiment, flanged tail plugs 5 and 6 preferably of elastic material, such as rubber, are mounted to the inner surfaces of both lengthwise ends of the grip 3 respectively.

Preferably flanges 51 and 61 at the tail plugs 5 and 6 each are made to have a larger outer diameter than each grip portion 31 or 32. Thus, when the first grip portion 31 or the second grip portion 32 is fitted into the rod body 1, the flange 51 or 61 of the tail plug 5 or 6 is elastically deformed to make elastic contact with the inner periphery of the grip insertion portion 13, thereby preventing a backlash at the utmost end of the first grip portion 31 or the second grip portion 32. Also, the second grip portion 32 is longer than the first grip portion 31 by a ratio of 4:1.

In the above-described construction, to increase a length of the grip 3 for a particular use, as shown in FIG. 2, the first grip portion 31 is fitted into the grip insertion portion 13 and the insertion control 33 abuts against the end face of the rod body 1 so as to set the insertion position of the grip 3 to be fitted. Thereafter, the threaded cone 4 screws with the screw thread 11 at the rod body 1, thereby fixing the grip 3 to the rod body 1.

When the grip 3 is intended to be reduced in length, the threaded cone 4 in FIG. 2 is unscrewed from the screw thread 11 and the first grip portion 31 is removed from the rod body 1 and the grip 3 is turned over. The second grip portion 32, as shown in FIG. 3, is fitted into the grip insertion portion 13 at the rod body 1, and the insertion control 33 abuts against the end face of the bottom portion to set the insertion position of the grip 3. Thereafter, the threaded cone 4 screws with the screw thread 11 at the rod body 1, thereby fixing the grip 3 to the rod body 1.

Figure 4:
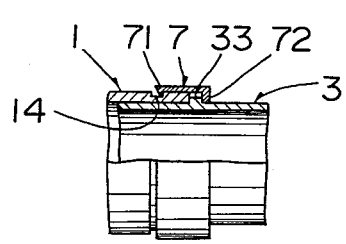
FIG. 4 through 6 are partially cutaway side views of modified embodiments of the invention, illustrating a fixing means according to the invention.
Figure 5:
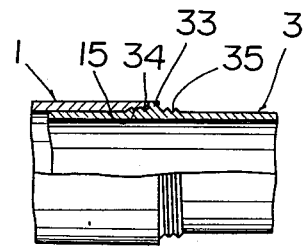

Alternatively, as shown in FIG. 4, for example, an annular retaining groove 14 is provided at the outer surface of the bottom portion of the rod body 1, and an engaging cone 7 having an engaging projection 71 engageable with the retaining groove 14 and an engaging portion 72 engageable with the insertion control 33 is held to the grip 3 so as to be movable and reversibly insertable into the grip insertion portion 13. As a result, engaging cone 7 may be moved to be elastically deformed at the engaging projection 71 to engage the engaging portion 71 with the retaining groove 14. Also alternatively, as shown in FIG. 5, the bottom portion of rod body 1 may be provided at the inner surface thereof with an internal screw thread 15, and external screw threads 34 and 35 engageable therewith may be provided at both lengthwise sides of insertion control 33. Such fixing means is not particularly defined or limited.

Figure 6:
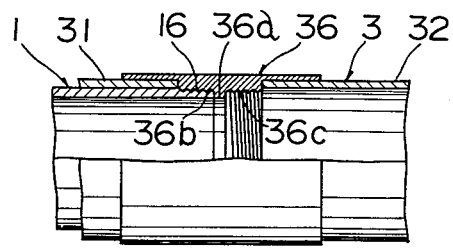

Alternatively, a rod body having no reel mounting portion may be constructed to couple with the grip 3. In this embodiment, the grip 3 may be fitted onto the outer surface of the rod body 1 rather than being fixed therein. When the grip 3 is fitted onto the rod body 1, as shown in FIG. 6, an external screw thread 16 is provided at the outer surface of the bottom portion of rod body 1, and the first grip portion 31 and the second grip portion 32 at the grip 3 are separate from each other. A connecting cylinder is interposed between the first grip portion 31 and the second grip portion 32. Connecting cylinder 36 is formed of metal or synthetic resin, has an insertion control 36a abutting against the end face of rod body 1 and is provided at both lengthwise sides of the insertion control 36a with internal screw threads 36b and 36c engageable with the external screw thread 16. First and second grip portions 31 and 32 are integral with each other through the connecting cylinder 36, so that the internal screw thread 36b or 36c screws with the external screw thread 16 to thereby detachably fix the grip 3 to the rod body 1.

As seen from the above, the fishing rod of the invention enables changing the length of the grip 3 coupled with the bottom rod of rod body 1, and moreover provides a single grip which enables changing the grip length by a turn-over operation. Grip 3 can always be set to the rod body 1, thereby preventing the grip from being lost or forgotten and providing a grip usable over a long time period.

Although several embodiments have been described above, they are merely exemplary of the invention and not to be construed as limiting, the invention being defined solely by the appended claims.

I claim:

1. A fishing rod, comprising:
   (a) a rod body which is hollow, has a gently tapered conical shape, and has a large diameter bottom portion, said bottom portion comprising a grip insertion portion,
   (b) a grip fitted into said grip insertion portion, said grip having a predetermined axial length which is greater than an axial length of said grip insertion portion and including one lengthwise side having a first grip portion having a first predetermined length and another lengthwise side having a second grip portion having a second predetermined length, said first length being shorter than said second length, said first grip portion and said second grip portion each comprising fitting means enabling said first grip portion and said second grip portion to be alternately and selectively fitted into said grip insertion portion, and an insertion control means disposed between said first grip portion and said second grip portion, said insertion control means for abutting against an end face of said grip insertion portion thereby to set an insertion position at which said grip is fitted into said rod body, and
   (c) fixing means for detachably fixing said grip to said rod body.

2. A fishing rod according to claim 1, wherein said grip insertion portion is cylindrical and has a substantially uniform diameter, said first grip portion and said second grip portion are cylindrical and an outer diameter of said first grip portion and said second grip portion is insertable into said grip insertion portion, said grip having a substantially uniform diameter.

3. A fishing rod according to claim 2, wherein said grip is provided at both lengthwise ends thereof with tail plugs each having flanges formed of elastic material, each of said flanges having a slightly larger outer diameter than an inner diameter of said grip insertion portion.

4. A fishing rod according to claim 2, wherein said grip insertion portion is provided at its outer periphery with an external screw thread and said fixing means comprises a threaded cone having an engaging portion engageable with said insertion control means and an internal screw thread screwable with said external screw thread such that said insertion control means is disposed between said engaging portion and said internal screw thread of said threaded cone, so that said rod body is screwable with said threaded cone to detachabnly fix said grip to said rod body.

5. A fishing rod according to claim 2, wherein said grip insertion portion is provided at its outer periphery with an annular retaining groove and said fixing means comprises an engaging cone having an engaging portion engageable with said insertion control means and an engaging projection adapted to be fitted into said retaining groove such that said insertion control means is disposed between said engaging portion and said engaging projection, so that said engaging projection engages with said retaining groove to thereby detachably fix said grip to said rod body.

6. A fishing rod according to claim 2, wherein said fixing means comprises an internal screw thread provided at an inner periphery of said grip insertion portion and external screw threads provided at an outer periphery at both axial sides of said insertion control means, said external screw threads being alternately screwable with said internal screw thread, so that each of said external screw threads screws with said internal screw thread of said rod body, thereby detachably fixing said grip to said rod body.

7. A fishing rod according to claim 1, wherein said grip insertion portion is cylindrical and has a substantially uniform diameter and said first grip portion and said second grip portion are cylindrical and have an inner diameter insertable onto an outer surface of said grip insertion portion, said grip being substantially uniform in diameter.

8. A fishing rod according to claim 7, wherein said fixing means comprises an external screw thread provided at an outer periphery of said grp insertion portion and internal screw threads provided at an inner periphery at both axial sides of said insertion control means, said internal screw threads being alternately screwable with said external screw thread, each of said internal screw threads screwing with said external screw thread, thereby detachably fixing said grip to said rod body.

9. A fishing rod according to claim 7, wherein said grip insertion portion is provided at its outer periphery with an external screw thread, said first grip portion and said second grip portion are separate elements, a connecting cylinder is provided between said first grip portion and said second grip portion, said connecting cylinder having (i) an insertion control abutting against an end face of said grip insertion portion and (ii) internal screw threads at both axial sides of said insertion control, said internal screw threads of said connecting cylinder being screwable with said external screw thread of said grip insertion portion, said connecting cylinder non-removably coupling said first grip portion and said second grip portion with each other, said internal screw threads of said connecting cylinder screwing with said external screw thread of said grip insertion portion to thereby detachably fix said grip to said rod body, said fixing means comprising said external screw thread of said grip insertion portion and said connecting cylinder.

10. A fishing rod according to claim 1, wherein said bottom portion of said rod body comprises a tapered portion which expands at a greater rate of change than a rate of change of a gently tapered tip portion of said rod body, said grip fitting portion is continuous with said tapered portion of said bottom portion and has a large diameter and an axial length sufficiently large to receive said second grip portion, and said grip has a cylindrical shape and a large diameter and an overall axial length greater than an axial length of said grip fitting portion.

* * * * *